: 3,047,595
12α-HALO-16α-HYDROXY STEROIDS OF
THE PREGNENE SERIES
Josef Fried, Princeton, N.J., assignor to Olin Mathieson
Chemical Corporation, New York, N.Y., a corporation
of Virginia
No Drawing. Filed Apr. 14, 1958, Ser. No. 728,051
7 Claims. (Cl. 260—397.45)

This application is a continuation-in-part of my parent application Serial No. 677,205, filed August 9, 1957.

This invention relates to, and has for its objects, the provision of new steroids which are useful intermediates in the preparation of physiologically active steroids and to a method of preparing the same.

The new steroids of this invention include steroids of the following general formula and intermediates therefor:

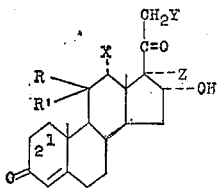

wherein the 1,2-position is saturated or double-bonded, R is hydrogen, R' is β-hydroxy or together R and R' is keto, X is halogen, Y is hydrogen or hydroxy, and Z is hydrogen or hydroxy.

These steroids are prepared by subjecting a steroid of the general formula

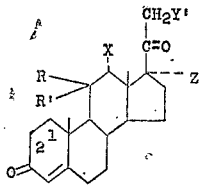

wherein the 1,2-position is saturated or double-bonded, R, R', X and Z are as hereinbefore defined, and Y' is hydrogen, hydroxy or acyloxy to the oxygenating action of a microorganism such as *Streptomyces roseochromogenus*, the microbial hydroxylation being carried out by the method described in the U.S. application of Josef Fried et al., Serial No. 453,411, filed August 31, 1954, now abandoned.

Among the suitable steroids which are utilizable as precursors in the microbial hydroxylation can be mentioned 12α-halo-11β-hydroxyprogesterones (e.g., 12α-fluoro-11β-hydroxyprogesterone), 12α - halo-11-ketoprogesterones (e.g., 12α-fluoro-11-ketoprogesterone), 12α-halo-$\Delta^{1,4}$-pregnadiene-11β-ol-3,20-diones (e.g., 12α-fluoro-$\Delta^{1,4}$-pregnadiene-11β-ol-3,20-dione), 12α - halo-$\Delta^{1,4}$-pregnadiene-3,11,20-triones, 12α - halo-11β,17α-dihydroxyprogesterones (e.g., 12α-fluoro-11β,17α-dihydroxyprogesterone), 12α - halo - 11-keto-17α-hydroxyprogesterones, 12α-halo-$\Delta^{1,4}$-pregnadiene-11β,17α-diol-3,20-diones, 12α - halo-$\Delta^{1,4}$-pregnadiene-17α-ol-3,11,20-triones, 12α - halo-corticosterones (e.g., 12α-fluorocorticosterone), 12α-halo-11-dehydrocorticosterones, 12α - halo-$\Delta^{1,4}$-pregnadiene-11β,21-diol - 3,20-diones, 12α-halo-$\Delta^{1,4}$-pregnadiene-21-ol-3,11,20-triones, 12α-halo-hydrocortisones (e.g., 12α-chlorohydrocortisone and 12α - fluorohydrocortisone), 12α - halocortisones, 12α - haloprednisolones (e.g., 12α-fluoroprednisolone), 12α-haloprednisones, and 21-esters of those steroids which contain a 21-hydroxy group (especially esters with hydrocarbon carboxylic acids of less than ten carbon atoms, as exemplified by the lower alkanoic acids, the lower alkenoic acids, the monocyclic aromatic carboxylic acids, the monocyclic aralkanoic acids, the cycloalkane carboxylic acids, and the cycloalkene carboxylic acids.

The action of the enzymes of *Streptomyces roseochromogenus* to produce the 16α-hydroxy derivatives of the steroid precursors can be utilized either by including the steroid in an aerobic culture of the microorganism or by bringing together, in an aqueous medium, the steroid, air and enzymes of non-proliferating cells of the microorganism. In general, the conditions of culturing the *Streptomyces roseochromogenus* for the purposes of this invention are (except for the inclusion of the steroid to be converted) the same as those of culturing *Streptomyces* for the production of antibiotics and/or vitamin $B_{12}$, i.e., the microorganism is aerobically grown in contact with (in or on) a suitable fermentation medium. A suitable medium essentially comprises a source of nitrogenous and growth-promoting factors, and an assimilable source of carbon and energy. The latter may be a carbohydrate and/or the steroid itself. Preferably, however, the medium includes an assimilable source of carbon and energy in addition to the steroid; and preferably, also, this source is at least in substantial part a member of the group consisting of (1) fatty acids having at least 14 carbon atoms and (2) fats. Use of such lipid source of carbon and energy (especially use of a fatty oil) is advantageous in that it enhances the availability of the steroid for conversion.

The nitrogen source materials may be organic (e.g., soybean meal, cornsteep liquor, meat extract, and/or distillers solubles) or synthetic (i.e., composed of simple, synthesizable organic or inorganic compounds such as ammonium salts, alkali nitrates, amino acids, urea or thiourea).

As to the energy source material, lipids, especially (1) fatty acids having at least 14 carbon atoms, (2) fats or (3) mixtures thereof, are preferred. Examples of such fats are lard oil, soybean oil, linseed oil, cottonseed oil, peanut oil, fancy mutton tallow, sperm oil, olive oil, tristearin, tripalmitin, triolein and trilaurein; and illustrative fatty acids include stearic, palmitic, oleic, linoleic and myristic acids.

Other carbon-containing materials may also be used. For example, such materials as glycerol, glucose, fructose, sucrose, lactose, maltose, dextrins, starches, whey, etc., are adequate carbon source materials. These materials may be used either in purified state or as concentrates, such as whey concentrate, corn, wheat or barley mash; or mixtures of the above may be employed. It is to be noted, however, that the steroid is added to the fermentation medium essentially as a precursor and not as an energy source.

The fermentation process results in the preparation of a 16α-hydroxy steroid corresponding to the precursor steroid, the 21-ester of the starting steroid, if any, having been hydrolyzed to yield the free 21-hydroxy derivative.

If a 17α-hydroxy steroid is employed as the precursor, the desired final product of this invention, namely, a 16α,17α-dihydroxy steroid, is obtained directly. These steroids are useful as disclosed in the parent application, Serial No. 677,205, in the preparation of the corresponding 16α,17α-acetal or ketal derivatives. If, however, a 17α-unsubstituted steroid is employed as the substrate (Z is hydrogen), then further steps are necessary to convert this steroid to a 17α-hydroxy derivative. This conversion may be effected according to the next step in the process of this invention by reacting the 17-unsubstituted steroid with a basic reagent, e.g., aluminum tertiary butylate, at an elevated temperature, the reaction preferably being conducted in a solvent for the steroid at the reflux temperature of the resulting system. The reaction results in the production of new 16,17-dehydro steroids of this invention having the general formula

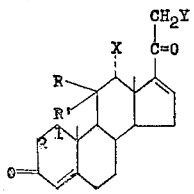

wherein the 1,2-position is saturated or double-bonded and R, R', X , and Y are as hereinbefore defined.

These 16,17-dehydro steroids are then treated with osmium tetroxide, preferably in the presence of an organic base, such as pyridine, to yield the osmate ester of the corresponding 16α,17α-dihydroxy derivative, which is then reduced and hydrolyzed, as by treatment with sodium sulfite or hydrogen sulfide, to give the free 16α, 17α-dihydroxy derivative.

Aside from their use as intermediates in the preparation of 16α,17α-acetals and ketals, certain of the new steroids of this invention are also useful per se as physiologically active substances. Thus, those steroids which are unsubstituted in both the 17α- and 21-positions (Y and Z are hydrogen) possess progestational activity and hence may be used in lieu of known progestational agents, such as progesterone, in the treatment of threatened abortion, dysmenorrhea, etc. Furthermore, those steroids which are unsubstituted in the 17-position and are hydroxylated in the 21-position (Y is hydroxy and Z is hydrogen) possess glucocorticoid activity and hence may be used in lieu of known glucocorticoids, such as hydrocortisone, in the treatment of rheumatoid arthritis and the allergic diseases.

The process of this invention can be represented by the following scheme:

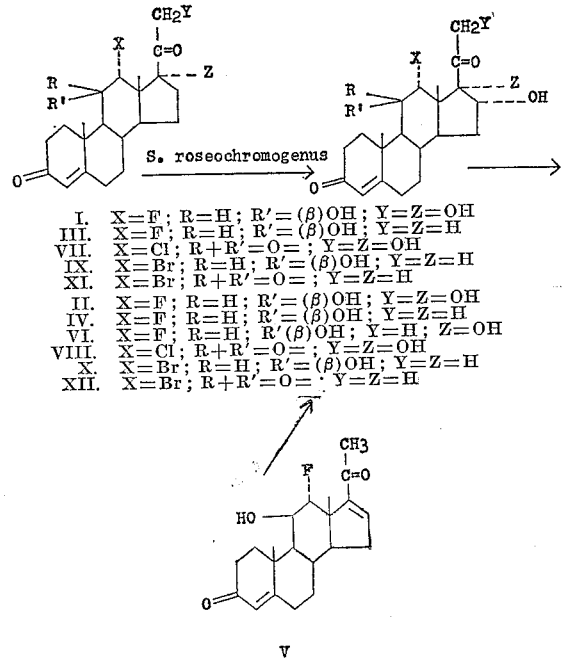

The following examples illustrate the invention (all temperatures being in centigrade):

EXAMPLE 1

*12α-Fluoro-16α-Hydroxyhydrocortisone (II)*

An aqueous medium of the following composition is prepared:

| | |
|---|---|
| Soybean meal nutrient | gram 15.0 |
| Glucose | do 10.0 |
| Soybean oil | do 2.2 |
| CaCO₃ | do 2.5 |
| Water | liter 1 |

The pH of the medium is adjusted to 7.0±0.1. Fifty ml. portions of the medium are distributed in 250 ml. Erlenmeyer flasks. The flasks are plugged with cotton and sterilized in the usual manner (by autoclaving). When cool, each of the flasks is supplemented with 0.25 ml. of a sterile solution of 12α-fluorohydrocortisone (I) in dimethyl formamide; thus 0.05% steroid in the medium is provided. Each flask is then inoculated with 5 to 10% of a vegetative inoculum of *Streptomyces roseochromogenus* (Waksman No. 3689). The inoculated flasks are incubated at 25° with rotatory mechanical shaking for 3 to 4 days, when the contents of 12 flasks are pooled, adjusted in pH to 4±0.2, and filtered through a clarifying pad on a Buechner funnel. The filtered broth is extracted with four 300-ml. portions of methyl isobutyl ketone, yielding, after removal of the solvent in vacuo, about 200 mg. of crude steroid, which crystallizes on standing. Recrystallization from ethanol yields pure 12α-fluoro-16α-hydroxyhydrocortisone.

Similarly, 12αfluoroprednisolone, 12α-fluorocortisone, 12α-fluoroprednisone, and 12α-fluoro-11β,17α-dihydroxyprogesterone yield 12α-fluoro-16α-hydroxyprednisolone, 12α-fluoro-16α-hydroxycortisone, 12α-fluoro-16α-hydroxyprednisone, and 12α-fluoro-11β,16α,17α-trihydroxyprogesterone (VI), respectively.

EXAMPLE 2

*12α-Chloro-16α-Hydroxycortisone (VIII)*

Employing the conditions of Example 1, but substituting 0.5 g. of 12α-chlorocortisone (VII) for the 12α-fluorocortisone, there is obtained 12α-chloro-16α-hydroxycortisone.

EXAMPLE 3

*12α-Fluoro-11β,16α,17α-Trihydroxyprogesterone (VI)*

(a) *Preparation of 12-fluoro-11β,16α-dihydroxyprogesterone (IV)*.—Microbiological hydroxylation of 12α-fluoro-11β-hydroxyprogesterone (III) with *Streptomyces roseochromogenus* (Waksman No. 3689) as described in Example 1 produces 16α-hydroxy-12α-fluoro-11β-hydroxyprogesterone (IV), which is extracted from the culture filtrate with chloroform. After removal of the solvent in vacuo, the residue is crystallized from acetone-hexane leaving the pure compound having the following properties: M.P. about 218–219°; [α]$_D^{23}$+164° (c., 0.50 in CHCl₃);

$\lambda_{max.}^{alc.}$ 240 m$\mu$ ($\epsilon$=16,000); $\lambda_{max.}^{Nujol}$ 2.98, 5.86, 6.03, 6.20$\mu$

*Analysis*—Calcd. for C₂₁H₂₉O₄F (364.44): C, 69.21; H, 8.02. Found: C, 68.97; H, 7.85.

(b) *Preparation of 12α-fluoro-Δ⁴,¹⁶-pregnadiene-11β-ol-3,20-dione (V)*.—A suspension of 400 mg. of 16α-hydroxy-12α-fluoro-11β-hydroxyprogesterone and 1.2 g. of aluminum tertiary butylate in 120 ml. of anhydrous toluene is heated to reflux for 2 hours. The cooled reaction mixture is washed with dilute hydrochloric acid, water, bicarbonate and again with water until neutral. The organic phase is dried over sodium sulfate and the solvent removed in vacuo. The residual crystalline mass upon recrystallization from acetone-hexane furnishes pure 12α-fluoro-Δ⁴,¹⁶-pregnadiene-11β-ol-3,20-dione (V) of the following properties: M.P. about 215–217°; [α]$_D^{23}$+209° (c., 0.56 in chlf.), $\lambda_{max.}^{alc.}$ 238 m$\mu$ ($\epsilon$=24,700), $\lambda_{max.}^{Nujol}$ 2.94, 5.94, 6.05, 6.16, 6.30$\mu$

*Analysis*—Calcd. for C₂₁H₂₇O₃F (346.43): C, 72.80; H, 7.86. Found: C, 72.56; H, 7.80.

(c) *Preparation of 12α-fluoro-Δ⁴-pregnene-11β,16α,17α-triol-3,20-dione (VI)*.—To a solution of 77 mg. of the diene (V) formed in section (b) and 0.1 ml. of pyridine in 5 ml. of benzene is added 65 mg. of osmium tetroxide. The mixture is allowed to stand in the dark for 18 hours during which period precipitation of a brown crystalline material occurs. For decomposition of the osmate ester, there is added to the mixture 7 ml. of water, 4.6 ml. of methanol, 700 mg. of sodium sulfite and 700 mg. of potassium bicarbonate, and the resulting suspension is stirred for four hours at room temperature. After dilution with 20 ml. of chloroform, the mixture is filtered through Celite and the precipitate washed thoroughly with chloroform. The layers are separated, the chloroform phase washed with water, dried over sodium sulfate and evaporated to dryness in vacuo. The crystalline residue is recrystallized from acetone-hexane, leaving the pure triol (VI) of the following properties: M.P. about 220–222°, $[\alpha]_D^{23} + 102°$ (c., 0.38 in CHCl);

$\lambda_{max.}^{alc.}$ 240 m$\mu$ ($\epsilon = 16,200$), $\lambda_{max.}^{Nujol}$ 2.90, 5.83, 6.02, 6.19$\mu$

*Analysis.*—Calcd. for $C_{21}H_{29}O_5F$ (380.44): C, 66.29; H, 7.68. Found: C, 66.28; H, 7.67.

Similarly, 12α-chloro-11β-hydroxyprogesterone, 12α-fluoro-11-ketoprogesterone, 12α-fluorocorticosterone, and 12α-fluoro-11-dehydrocorticosterone yield 12α-chloro-11β,16α,dihydroxyprogesterone, 12α-fluoro-16α - hydroxy-11-ketoprogesterone, 12α-fluoro-16α - hydroxycorticosterone and 12α-fluoro-16α-hydroxy-11-dehydrocorticosterone, respectively; then 12α-chloro-$\Delta^{4,16}$-pregnadiene-11β-ol-3,20-dione, 12α-fluoro-$\Delta^{4,16}$-pregnadiene-3,11,20-trione, 12α-fluoro-$\Delta^{4,16}$-pregnadiene-11β,21-diol-3,20-dione, and 12α-fluoro-$\Delta^{4,16}$-pregnadiene-21-ol-3,11,20-trione, respectively; and finally 12α-chloro-11β,16α,17α-trihydroxyprogesterone, 12α-fluoro-11-keto-16α,17α - dihydroxyprogesterone, 12α-fluoro-16α-hydroxyhydrocortisone (II), and 12α-fluoro-16α-hydroxycortisone, respectively.

EXAMPLE 4

12α-Bromo-11β,16α-Dihydroxyprogesterone (X)

Microbiological hydroxylation of 12α-bromo-11β-hydroxyprogesterone (IX) with *Streptomyces roseochromogenus* (Waksman No. 3689) as described in Example 1 produces 16α-hydroxy-12α-bromo-11β-hydroxyprogesterone (X) which is extracted from the culture filtrate with chloroform. After removal of the solvent in vacuo, the crystalline residue is recrystallized from acetone-hexane. The pure compound has the following properties: M.P. about 211–212°; $[\alpha]_D^{26} + 101°$ (in CHCl$_3$);

$\lambda_{max.}^{Nujol}$ 2.87, 3.01, 5.85, 5.86, 6.16$\mu$

*Analysis*—Calcd. for $C_{21}H_{29}O_4Br$ (425.35): C, 59.29; H, 6.87; Br, 18.79. Found: C, 59.11; H, 7.00; Br, 18.40.

EXAMPLE 5

12α-Bromo-16α-Hydroxy-11-Ketoprogesterone (XII)

Following the procedure of Example 4, 12α-bromo-11-ketoprogesterone (XI) is converted into 16α-hydroxy-12α-bromo-11-ketoprogesterone (XII).

The invention may be variously otherwise embodied within the scope of the appended claims.

What is claimed is:
1. A compound selected from the group consisting of steroids of the general formulae

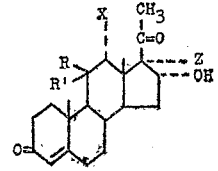

and

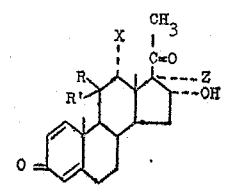

wherein R is hydrogen, R' is β-hydroxy and together R and R' is keto, X is a halogen of atomic number less than 53, and Z is selected from the group consisting of hydrogen and hydroxy.

2. 12α-fluoro-11β,16α-dihydroxyprogesterone.
3. 12α-fluoro-11β,16α,17α-trihydroxyprogesterone.
4. A compound selected from the group consisting of steroids of the general formula

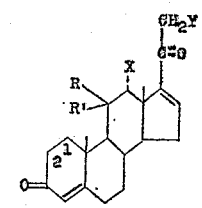

and the 1,2-dehydro derivatives thereof, wherein R is hydrogen, R' is β-hydroxy and together R and R' is keto, X is a halogen of atomic number less than 35, and Y is selected from the group consisting of hydrogen and hydroxy.

5. 12α-halo-$\Delta^{4,16}$-pregnadiene-11β-ol-3,20-dione, wherein the halo has an atomic number less than 53.
6. 12α-fluoro-$\Delta^{4,16}$-pregnadiene-11β-ol-3,20-dione.
7. 12α-chloro-16α-hydroxycortisone.

References Cited in the file of this patent

UNITED STATES PATENTS

| | | |
|---|---|---|
| 2,822,318 | Kroll et al. | Feb. 4, 1958 |
| 2,831,003 | Thomas | Apr. 15, 1958 |
| 2,979,517 | Herzog | Apr. 11, 1961 |

OTHER REFERENCES

McGuckin et al.: 77 J.A.C.S., 1822–24 (1955).